US012562933B2

(12) United States Patent
Quintero et al.

(10) Patent No.: US 12,562,933 B2
(45) Date of Patent: *Feb. 24, 2026

(54) LIMITED COMMUNICATIONS THREADS ASSOCIATED WITH CONSTRUCTION BASED DATA OBJECTS

(71) Applicant: Procore Technologies, Inc., Carpinteria, CA (US)

(72) Inventors: Nicolas Quintero, Austin, TX (US); Stephen Hackley, Austin, TX (US); Sadra Kassaei, Los Angeles, CA (US); Megan Work, Summerland, CA (US); Chance Eakin, Austin, TX (US); Rein Henrichs, Portland, OR (US)

(73) Assignee: Procore Technologies, Inc., Carpinteria, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/785,623

(22) Filed: Jul. 26, 2024

(65) Prior Publication Data

US 2025/0039012 A1     Jan. 30, 2025

Related U.S. Application Data

(63) Continuation of application No. 18/345,543, filed on Jun. 30, 2023, now Pat. No. 12,052,115.

(51) Int. Cl.
| | |
|---|---|
| *G06F 15/16* | (2006.01) |
| *H04L 12/18* | (2006.01) |
| *H04L 51/52* | (2022.01) |

(52) U.S. Cl.
CPC ............ *H04L 12/185* (2013.01); *H04L 51/52* (2022.05)

(58) Field of Classification Search
CPC ........ H04L 12/185; H04L 51/52; H04L 12/18
(Continued)

(56) References Cited

U.S. PATENT DOCUMENTS

| | | | | |
|---|---|---|---|---|
| 9,300,609 | B1 * | 3/2016 | Beausoleil | .............. H04L 63/08 |
| 2012/0297313 | A1 | 11/2012 | Sharma | |

(Continued)

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

*Primary Examiner* — Kaylee J Huang
(74) *Attorney, Agent, or Firm* — Lee Sullivan Shea & Smith LLP

(57) ABSTRACT

A computing platform is configured to: (i) generate a data object; (ii) initialize a public conversation thread associated with the data object, the public conversation thread is accessible by each of a first group of users; (iii) cause a client device to present an interface for creating one or more limited conversation threads associated with the data object; (iv) after causing the client device to present the interface, receive, from the client device, a request to create a limited conversation thread associated with the data object that is accessible by each of a second group of users, wherein the second group of users is a first subset of the first group of users; and (v) based on the second request, generate the limited conversation thread associated with the data object, wherein the limited conversation thread is accessible by the second group of users.

20 Claims, 14 Drawing Sheets

(58) Field of Classification Search
USPC .................................. 709/206, 204, 203, 217
See application file for complete search history.

(56) References Cited

U.S. PATENT DOCUMENTS

| | | | | |
|---|---|---|---|---|
| 2013/0246525 A1* | 9/2013 | Patil | .................... | H04L 12/1827 |
| | | | | 709/204 |
| 2017/0041263 A1 | 2/2017 | Shekel | | |
| 2018/0324116 A1 | 11/2018 | Vaduva | | |
| 2022/0092518 A1* | 3/2022 | Choi | ................ | G06Q 10/06316 |

* cited by examiner 700, 416

RECEIVE REQUEST TO POST FIRST MESSAGE TO LIMITED CONVERSATION THREAD FROM USER IN LIMITED GROUP ⟋702

BASED ON REQUEST, CAUSE FIRST MESSAGE TO BE POSTED TO LIMITED CONVERSATION THREAD ⟋704

CAUSE FIRST LIMITED CONVERSATION THREAD TO BE UPDATED INCLUDING POSTED FIRST MESSAGE ⟋706

CAUSE FIRST LIMITED CONVERSATION THREAD TO BE PRESENTED TO SECOND GROUP ⟋708

LIMITED COMMUNICATIONS THREADS ASSOCIATED WITH CONSTRUCTION BASED DATA OBJECTS

CROSS-REFERENCE TO RELATED APPLICATION

This application claims the benefit of priority under 325 U.S.C. § 120 to U.S. application Ser. No. 18/345,543, filed Jun. 30, 2023 and entitled "Limited Communications Threads Associated with Construction Based Data Objects," the contents of which are incorporated by reference herein in their entirety.

BACKGROUND

Construction projects are often complex endeavors involving the coordination of many professionals across several discrete phases. Such projects have multiple planning and building phases that occur and require lengthy communication. The planning phases may involve contract bidding, contractor selection, project feasibility studies, regulatory approval and/or permitting, among other known planning phases.

Typically, a construction project commences with a design phase, where architects design the overall shape and layout of a construction project, such as a building. Next, engineers engage in a planning phase where they take the architects' designs and produce engineering drawings and plans for the construction of the project. At this time, engineers may also design various portions of the project's infrastructure, such as HVAC, plumbing, electrical, etc., and produce plans reflecting these designs as well.

After, or perhaps in conjunction with, the planning phase, contractors may engage in a logistics phase to review these plans and begin to allocate various resources to the project, including determining what materials to purchase, scheduling delivery, and developing a plan for carrying out the actual construction of the project. Finally, during the construction or implementation phase, construction professionals begin to construct the project based on the finalized plans.

Such construction planning, design, and implementation may involve many individuals, each assigned to different tasks associated with the project. Software technology has been developed to enable electronic management of information associated with a construction project, which includes facilitating communications between individuals assigned to tasks of the construction project.

Overview

As mentioned above, software technology has been developed to enable computing platforms to ingest and store information associated with construction projects in an effort to facilitate electronic management of construction project information. However, the construction industry, as a whole, remains susceptible to various inefficiencies related to communications associated with this vast amount of information and the processing thereof. Particularly, many issues arise regarding communications associated with individual data objects of this vast amount of information.

The software technology, as executed by a computing platform, discussed herein may be capable of receiving, generating, presenting, and/or otherwise utilizing data objects that are accessible by multiple users of the computing platform. "Data objects," as defined herein, generally refer to an electronic representation of a type of data record related to a project or task. In some examples, the computing platform associated with such data objects operates to facilitate the electronic management of construction project information. In such examples, the data objects are, generally, associated with one or more construction projects or tasks.

As defined herein, a "construction project" refers to any building, construction, demolition, and/or removal of a structure, public or private infrastructure, landscaping, greenery, or otherwise large scale movement or construction of property on real estate. A "construction project task" refers to one or more sub-divided tasks associated with the defined construction project, which may be one of a planning task, an engineering task, and/or a construction task, among other possibilities.

Accordingly, data objects related to or associated with construction projects and tasks may include, but are not limited to including schedules, work breakdown structures (WBSes), requests for information (RFIs), punch lists and/or punch items thereof, workflows, contracts, change orders, observations, drawing objects (such as engineering or architectural drawing objects), financial data objects, among other known data objects. Engineering or architectural drawing objects may include, but are not limited to including, technical drawings, two-dimensional and/or three-dimensional models, blueprints for one or more aspects of the construction project, among other known data objects. Financial data objects, generally, refer to data objects related to the transfer of currency, value, or labor between two or more users of the platform or parties they represent. Such financial data objects may include, but are not limited to including, budgets, invoices, statements of work, time sheets, bidding forms, among other known examples of financial data objects, among other possibilities.

It should be well understood that the construction project tasks associated with any of the data objects noted above often require significant collaboration and/or communication amongst users that have access to the respective data objects. As one example, an RFI data object, generally, refers to a data object representative of a process initiated by a user of the platform (e.g., a general contractor, a subcontractor, a supplier, etc.) to request information or raise concerns that must be formally answered by another user of the platform (e.g., a contractor's client, a project's architect, a project's engineer, etc.). In some examples, the answering user's answer to the RFI may change a project's scope (e.g., leading to a change order data object) and/or require approval from another user of the platform. Accordingly, communication, over the computing platform, is often vital to properly handle RFIs in an efficient and timely manner.

As another example, a data object representing or associated with a punch list, generally, refers to a list of work items that must be completed to conform to a project supervisor's specifications. Punch lists are typically prepared by a supervisory user of the computing platform (e.g., an owner, architect, or general contractor, etc.). In some examples, punch lists are used during an inspection of a construction site when the project is near completion. To that end, a punch list may provide platform users with a list of items that must be completed in an allotted time period for the project to be considered fully complete. Given the collaborative nature of punch lists, active and convenient communication, regarding a punch list, is often quite important.

While the above mentioned examples of construction-related data objects certainly is not limiting nor exhaustive, said examples illustrate a variety of data objects that can be created and, thereafter, accessed and/or viewed by end users of a computing platform. To that end, for a variety of reasons, each data object may be accessible/viewable by a finite number of users of the computing platform. Such limiting of access to data objects may be based on, but is not limited to being based on, security concerns, privacy concerns, tactical concerns (e.g., negotiating positions), user-level concerns, need-to-know nature of a data object, confidential organizational information, administrative level data, among other reasons for maintaining limited or restricted access to a data object on a computing platform. For example, access to a specific data object may be limited to a team within a company (e.g., a contracting company) that is working on that specific project. Alternatively, another data object that is associated with the same team or company may have a smaller, more limited access group, due to the information either being, for example, on a "need to know" basis or otherwise restricted to a more executive level of employee of the company.

Accordingly, a construction management based computing platform, such as those owned and maintained by Procore Technologies, may include conversation threads associated with data objects. A "thread" or a "conversation thread," as defined herein, may refer to any data object, data listing, text listing, text display, listing of other stored data objects, among other contributable data listings to which two or more users are capable of adding data. While generally referenced herein in the context of conversations (e.g., text based communications on the computing platform), it is certainly contemplated that conversation threads may include other forms of user submitted or posted data or data objects, such as external program files (e.g., word processor files, spreadsheet files, presentation files, and the like), audio files, video files, images, among other known forms of digital data.

In some examples, the object conversation threads are created or initiated by the computing platform when a data object is generated on the platform and access, to the data object, is granted to users of the platform. In some other examples, it may be a selectable option to generate a conversation thread, on the computing platform, at creation or at a later time during the life of the data object.

Said conversation threads, associated with data objects, may be, themselves, data objects generated on the computing platform in response to a request for creation of a data object or for the conversation thread thereof. In such situations, the conversation thread data objects exist as a conversation data object associated with another construction-related data object. Such conversation threads may include any number of users, so long as each user has access to the data object associated with the conversation thread. In some examples, one or more of such conversation threads may be accessed via a specific software application, such as Procore Technologies' Conversations application.

Even if access to a specific data object is limited to some degree, (e.g., accessible to less than all users on a specific organization's instance of the management computing platform), certain data objects may be viewable, editable, and/or otherwise accessed by a large and diverse group of users. While data object based conversation threads are certainly valuable for facilitating communication associated with specific data objects, another level of security may still be desired due to the access to the data object that is held by the large and diverse group of users.

Consider, for example, a conversation thread that is accessible by all users with access to a blue print; in said example, there is a dispute between a sub-group, with access, that are engineers and another sub-group, with access, of architects. Both sub-groups have members from different organizations (e.g., firms, contractors, etc.) that do not have convenient ways of contacting one another; but, they would like to, as they are in dispute, together, with another group of users. There is not a convenient way for the sub-groups of architects or engineers to discuss their issues, over the conversation thread, amongst their respective sub-groups, without risk of their conversations being seen by the other group.

Alternatively, consider a conversation thread associated with a bidding based data object, wherein multiple contractors are actively bidding on work for the construction project. In such examples, time is of the essence in making decisions and getting bids in before deadlines—so, even if a group of users associated with a contractor may have alternative means for communication with their colleagues, outside of the computing platform, it would be advantageous if there was a faster means of focused communication, amongst a sub-group of bidders, directly associated with the bidding data object that was also private with respect to their bidding competitors.

To that end, the inventions and embodiments disclosed herein aim to introduce public and limited conversation threads associated with data objects, such as data objects related to a construction project. The disclosed software technology utilizes a computing platform to generate a public conversation thread, in response to generation of a data object by the computing platform. In some embodiments, the public conversations thread is not automatically generated based on the request to create the data object, but rather is created on-demand based on a user request. The public conversation thread may be accessible by all platform users that are granted access to the associated data object. Conversations and the contents and messages of the public conversation thread may be accessible by all platform users that have access to the associated data object.

In addition to creating the public conversation thread, one or more users of the computing platform may provide input, via an interface displayed on a client device, that is utilized in generating one or more limited conversation threads for the data object. The limited conversation thread is accessible to a group of users of the computing platform that is formed as a sub-group of the broader group of users that has access to the data object and, in turn, the public conversation thread.

The limited conversation thread(s), once generated, can then be provided to users of the sub-group(s) and the computing platform will cause respective client stations to display the limited conversation thread(s) to users of the sub-group. Then, any member of the sub-group can post messages (or other data) to the limited conversation thread, which, subsequently, can be accessed by other members of the sub-group, via a client device associated with respective members of the sub-group.

The computing platform disclosed herein is capable of generating any number of data objects and respective associated public conversation threads. From respective groups of users associated with each respective public conversation thread, any number of limited conversation threads can be generated with subgroups of users from the public conversation threads. More plainly, unlimited limited conversation threads may be generated, each for an unlimited number of data objects.

In line with the discussion above, the disclosed technology may be implemented as one or more software applications that facilitate the creation and management of data during the course of a construction project, some examples of which may include the types of software applications developed by Procore Technologies. Further, in practice, the computing platform in which the disclosed technology is incorporated may take the form of a software as a service ("SaaS") application that comprises a front-end software component running on a user's client station and a back-end software component running on a back-end computing platform that is accessible to the user client station via a communication network such as the Internet.

In one aspect, disclosed herein is a method that involves a computing platform (i) receiving a first request to generate a first data object related to a construction project, (ii) based on the first request, (a) generating the first data object, and (b) initializing a first public conversation thread associated with the first data object, wherein the first public conversation thread is accessible by each of a first group of users, (iii) causing a client device to present a first interface for creating one or more limited conversation threads associated with the first data object, (iv) after causing the client device to present the first interface, receiving, from the client device, a second request to create a first limited conversation thread associated with the first data object that is accessible by each of a second group of users, wherein the second group of users is a first subset of the first group of users, (v) based on the second request, generating the first limited conversation thread associated with the first data object, wherein the first limited conversation thread is accessible by the second group of users, (vi) providing at least one user in the second group of users with access to the first limited conversation thread.

In another aspect, disclosed herein is a computing platform that includes a network interface, at least one processor, a non-transitory computer-readable medium, and program instructions stored on the non-transitory computer-readable medium that are executable by the at least one processor to cause the computing platform to carry out the functions disclosed herein, including but not limited to the functions of the foregoing method.

In yet another aspect, disclosed herein is a non-transitory computer-readable storage medium provisioned with software that is executable to cause a computing platform to carry out the functions disclosed herein, including but not limited to the functions of the foregoing method.

One of ordinary skill in the art will appreciate these as well as numerous other aspects in reading the following disclosure.

Figure 1:
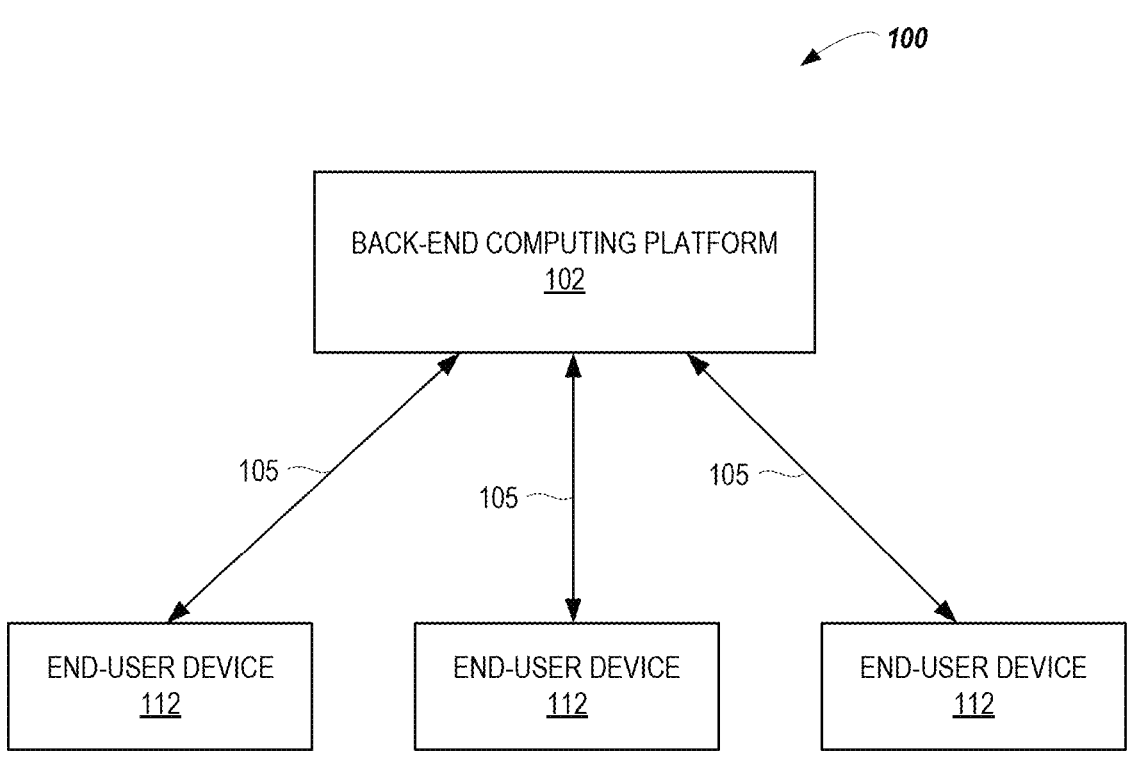
FIG. 1 depicts an example network configuration in which example embodiments may be implemented.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

The following disclosure refers to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE NETWORK CONFIGURATION

As one possible implementation, this software technology may include both front-end software running on one or more end-user devices that are accessible to users of the software technology and back-end software running on a back-end computing platform (sometimes referred to as a "cloud" platform or a "data" platform) that interacts with and/or drives the front-end software, and which may be operated (either directly or indirectly) by a provider of the front-end client software (e.g., Procore Technologies, Inc.). As another possible implementation, this software technology may include front-end client software that runs on end-user devices without interaction with a back-end platform (e.g., a native software application, a mobile application, etc.). The software technology disclosed herein may take other forms as well.

Turning now to the figures, FIG. 1 depicts an example network configuration 100 in which example embodiments of the present disclosure may be implemented. As shown in FIG. 1, the network configuration 100 includes an example back-end computing platform 102 that may be communicatively coupled to one or more client stations, depicted here, for the sake of discussion, as three end-user devices 112.

In practice, the back-end computing platform 102 may generally comprise some set of physical computing resources (e.g., processors, data storage, communication interfaces, etc.) that are utilized to implement the new software technology discussed herein. This set of physical computing resources may take any of various forms. As one possibility, the back-end computing platform 102 may comprise cloud computing resources that are supplied by a third-party provider of "on demand" cloud computing resources, such as Amazon Web Services (AWS), Amazon Lambda, Google Cloud Platform (GCP), Microsoft Azure, or the like. As another possibility, the back-end computing platform 102 may comprise "on-premises" computing resources of the organization that operates the back-end computing platform 102 (e.g., organization-owned servers).

As yet another possibility, the back-end computing platform 102 may comprise one or more dedicated servers have been provisioned with software for carrying out one or more of the computing platform functions disclosed herein, including but not limited to functions related to generating one or more of data objects, public conversation threads, limited conversation threads, or combinations thereof, facilitating conversations and/or data sharing, via the end-user devices 112, among other communications related functions. The one or more computing systems of the back-end computing platform 102 may take various other forms and be arranged in various other manners as well.

In turn, end-user devices 112 may take any of various forms, examples of which may include a desktop computer, a laptop, a netbook, a tablet, a smartphone, and/or a personal digital assistant (PDA), among other possibilities.

As further depicted in FIG. 1, the back-end computing platform 102 may be configured to communicate with the end-user devices 112 over respective communication paths 105. Each communication path 105 between the back-end computing platform 102 and an end-user device 112 may generally comprise one or more communication networks and/or communications links, which may take any of various forms. For instance, each respective communication path 105 with the back-end computing platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path 105 with the back-end computing platform 102 may be wireless, wired, or some combination thereof, and may carry data according to any of various different communication protocols. Although not shown, the respective communication paths with the back-end computing platform 102 may also include one or more intermediate systems. For example, it is possible that the back-end computing platform 102 may communicate with a given end-user device 112 via one or more intermediary systems, such as a host server (not shown). Many other configurations are also possible.

Although not shown in FIG. 1, the back-end computing platform 102 may also be configured to receive data from one or more external data sources that may be used to facilitate functions related to the processes disclosed herein. For example, the back-end computing platform 102 may be configured to generate conversation threads and facilitate conversations thereon, as discussed herein.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE COMPUTING DEVICES

Figure 2:
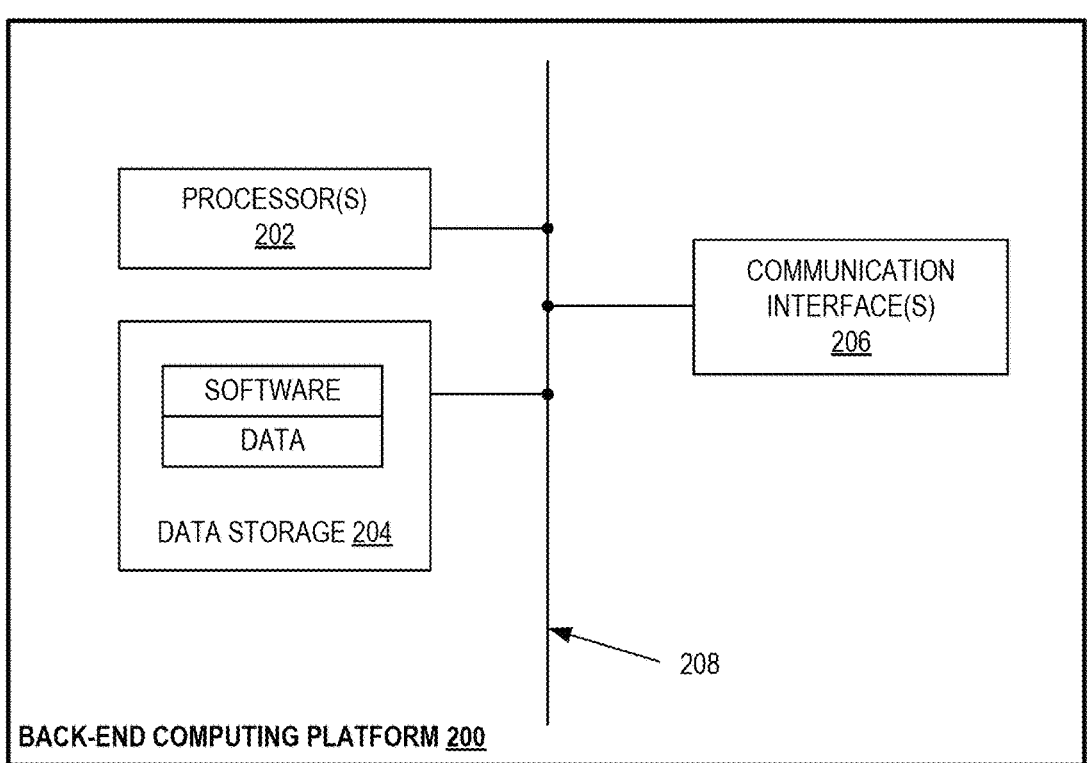
FIG. 2 depicts an example computing platform that may be configured to carry out one or more of the functions according to the disclosed technology.

FIG. 2 is a simplified block diagram illustrating some structural components that may be included in an example computing platform 200. The example computing platform 200 could serve as, for instance, the back-end computing platform 102 of FIG. 1 that may be configured to create and/or run the conversations threads and disclosed facilitation of conversations thereon. In line with the discussion above, the computing platform 200 may generally comprise one or more computer systems (e.g., one or more servers), and these one or more computer systems may collectively include at least one or more processors 202, a data storage 204, and one or more communication interfaces 206, all of which may be communicatively linked by a communication link 208 that may take the form of a system bus, a communication network such as a public, private, or hybrid cloud, or some other connection mechanism.

The one or more processors 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that the one or more processors 202 could comprise processing components that are distributed across a plurality of physical computing resources connected via a network, such as a computing cluster of a public, private, or hybrid cloud.

In turn, the data storage 204 may comprise one or more non-transitory computer-readable storage mediums that are collectively configured to store (i) program instructions that are executable by the one or more processors 202 such that the computing platform 200 is configured to perform some or all of the disclosed functions and (ii) data that may be received, derived, or otherwise stored, for example, in one or more databases, file systems, or the like, by the computing platform 200 in connection with the disclosed functions. In this respect, the one or more non-transitory computer-readable storage mediums of the data storage 204 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 204 may comprise computer-readable storage mediums that are distributed across a plurality of physical computing resources connected via a network, such as a storage cluster of a public, private, or hybrid cloud. Data storage 204 may take other forms and/or store data in other manners as well.

The one or more communication interfaces 206 may be configured to facilitate wireless and/or wired communication with external data sources and/or end-user devices, such as the end-user devices 112 in FIG. 1. Additionally, in an implementation where the computing platform 200 comprises a plurality of physical computing resources connected via a network, the one or more communication interfaces 206 may be configured to facilitate wireless and/or wired communication between those physical computing resources (e.g., between computing and storage clusters in a cloud network). As such, the one or more communication interfaces 206 may take any suitable form for carrying out these functions, examples of which may include an Ethernet interface, a serial bus interface (e.g., Firewire, USB 3.0, etc.), a chipset and antenna adapted to facilitate wireless communication and/or any other interface that provides for wireless communication (e.g., Wi-Fi communication, cellular communication, short-range wireless protocols, etc.) and/or wired communication, among other possibilities. The one or more communication interfaces 206 may also include multiple communication interfaces of different types. Other configurations are possible as well.

Although not shown, the computing platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with the computing platform 200.

It should be understood that the computing platform 200 is one example of a computing platform that may be used with the embodiments described herein. Numerous other arrangements are possible and contemplated herein. For instance, other computing platforms may include additional components not pictured and/or more or less of the pictured components.

Figure 3:
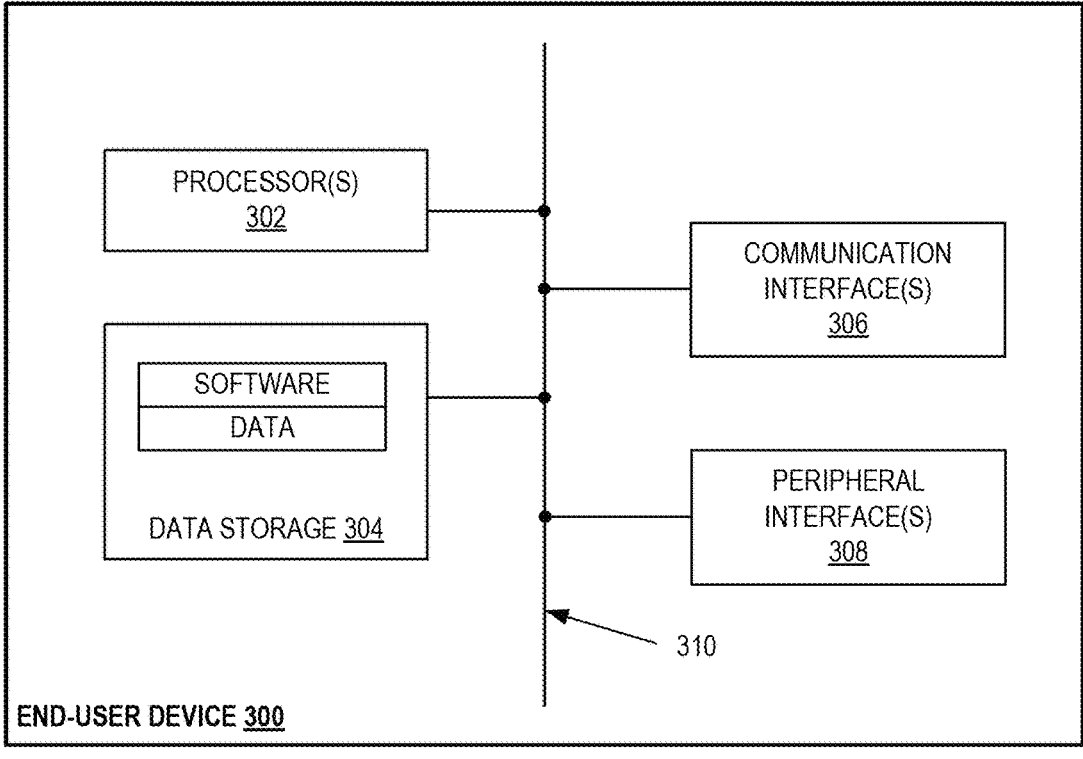
FIG. 3 depicts a structural diagram of an example end-user device that may be configured to communicate with the example computing platform of FIG. 2 and also carry out one or more functions in accordance with the disclosed technology.

Turning now to FIG. 3, a simplified block diagram is provided to illustrate some structural components that may be included in an example end-user device 300, such as an end-user device 112 described above with reference to FIG. 1. As shown in FIG. 3, the end-user device 300 may include one or more processors 302, data storage 304, one or more communication interfaces 306, and one or more user-interface components 308, all of which may be communicatively linked by a communication link 310 that may take the form of a system bus or some other connection mechanism. Each of these components may take various forms.

The one or more processors 302 may comprise one or more processing components, such as general-purpose processors (e.g., a single- or a multi-core CPU), special-purpose processors (e.g., a GPU, application-specific integrated circuit, or digital-signal processor), programmable logic devices (e.g., a field programmable gate array), controllers (e.g., microcontrollers), and/or any other processor components now known or later developed.

In turn, the data storage 304 may comprise one or more non-transitory computer-readable storage mediums that are collectively configured to store (i) program instructions that are executable by the processor(s) 302 such that the end-user device 300 is configured to perform certain functions related to interacting with and accessing services provided by a computing platform, such as the example computing platform 200 described above with reference to FIG. 2, and (ii) data that may be received, derived, or otherwise stored, for example, in one or more databases, file systems, repositories, or the like, by the end-user device 300, related to interacting with and accessing the services provided by the computing platform. In this respect, the one or more non-transitory computer-readable storage mediums of the data storage 304 may take various forms, examples of which may include volatile storage mediums such as random-access memory, registers, cache, etc., and non-volatile storage mediums such as read-only memory, a hard-disk drive, a solid-state drive, flash memory, an optical-storage device etc. The data storage 304 may take other forms and/or store data in other manners as well.

The one or more communication interfaces 306 may be configured to facilitate wireless and/or wired communication with other computing devices. The one or more communication interfaces 306 may take any of various forms, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Other configurations are possible as well.

The end-user device 300 may additionally include or have interfaces for one or more user-interface components 308 that facilitate user interaction with the end-user device 300, such as a keyboard, a mouse, a trackpad, a display screen, a touch-sensitive interface, a stylus, a virtual-reality headset, and/or one or more speaker components, among other possibilities.

It should be understood that the end-user device 300 is one example of an end-user device that may be used to interact with a computing platform as described herein. Numerous other arrangements are possible and contemplated herein. For instance, in other embodiments, the end-user device 300 may include additional components not pictured and/or more or fewer of the pictured components. Further, the end user device 300 of FIG. 3 and/or the end user device 112 of FIG. 1 may be examples of client devices utilized by users of the computing platform 200.

III. EXAMPLE OPERATIONS

As mentioned above, Procore Technologies has continued to develop software technology related to construction management and communications amongst platform users associated with such managed projects. Disclosed herein is new software technology that is generally directed to receiving or generating, at a computing platform, data objects related to construction projects, generating limited conversation threads associated with the data objects, as subsets of a broader or "public" group for communications associated with said data objects, and utilizing the limited conversation threads for more limited discussion around the data objects.

i. Systems and Methods of Generating Limited Conversation Threads Associated with Data Objects Turning now to FIG. 4, an example flow diagram is illustrated for a method 400 carried out by a computing platform, which may take the form of one or more of the back-end computing platform 102, 200, the end-user device(s) 300, or combinations thereof. The method 400 may begin at block 402, where the computing platform 102 receives a request to generate a data object related to a construction project. The request may be submitted affirmatively by a user of the computing platform 102, via, for example a client device, such as the end user device 300. Additionally or alternatively, the request may be, at least in part, based on prior data stored by the computing platform 102 such as, but not limited to, template data objects, data storage of prior user activity, user data, among other more automated methods of generating a data object.

Then, at block 404, based on the received request, the computing platform 102 generates a data object. Examples of generating a data object, based on a user request, include, but are not limited to including, generating an RFI, generating and/or populating an invoice, generating a punch sheet, generating an image-based data object based on input data and/or stored data files, among other things.

Further, at block 406, based on the request to generate the data object, the computing platform 102 initializes a public conversation thread associated with the data object. Additionally or alternatively, the computing platform 102 may be configured to generate the public conversation thread automatically, in response to the first request, and/or the computing platform 102 may be configured to generate the public conversation thread in response to instructions to generate the public conversation thread. In other words, the public conversation thread may be either generated automatically, in response to generation of the data object, or the public conversation thread may be generated in response to instructions from a user of the computing platform 102.

At block 408, the computing platform 102 causes a client device (e.g., an end-user device 300) to present an interface for creating one or more limited conversation threads associated with the data object. A limited conversation thread refers to a conversation thread, as defined above, that includes at least some of the members of a public conversation thread associated with a common data object. In other words, if the public conversation thread includes a first group of users, then the limited conversation thread includes a second group of users that is a subset of the first group of users.

At block 410, after causing the client device (e.g., a user device 300) to present the interface at block 408, the computing platform 102 receives, from the client device, a request to create a limited conversation thread associated with the data object. In some examples, the request to create a limited conversation thread includes an identification of users for inclusion in the second group of users for the limited conversation thread. In some additional or alternative examples, the request to create a limited conversation thread includes an indication of at least some of the users to include in the second group. Further still, in some examples, the request to create a limited conversation thread includes a title for the limited conversation thread, to be created in response to the request.

Figure 5A:
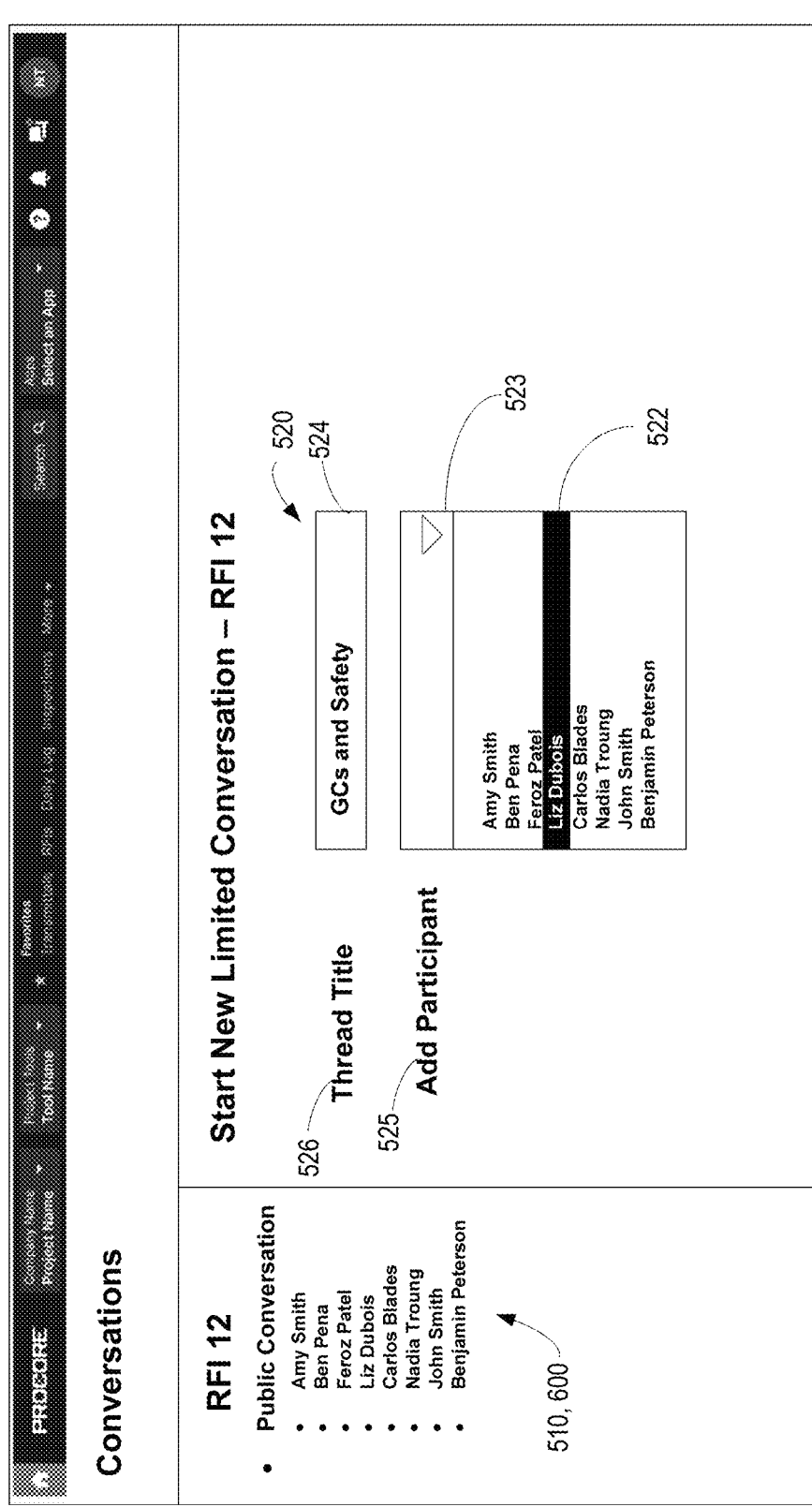
FIG. 5A depicts a first example graphic interface utilized in generating the limited conversation thread of FIG. 4, according to one possible implementation of the disclosed technology.
Figure 5B:
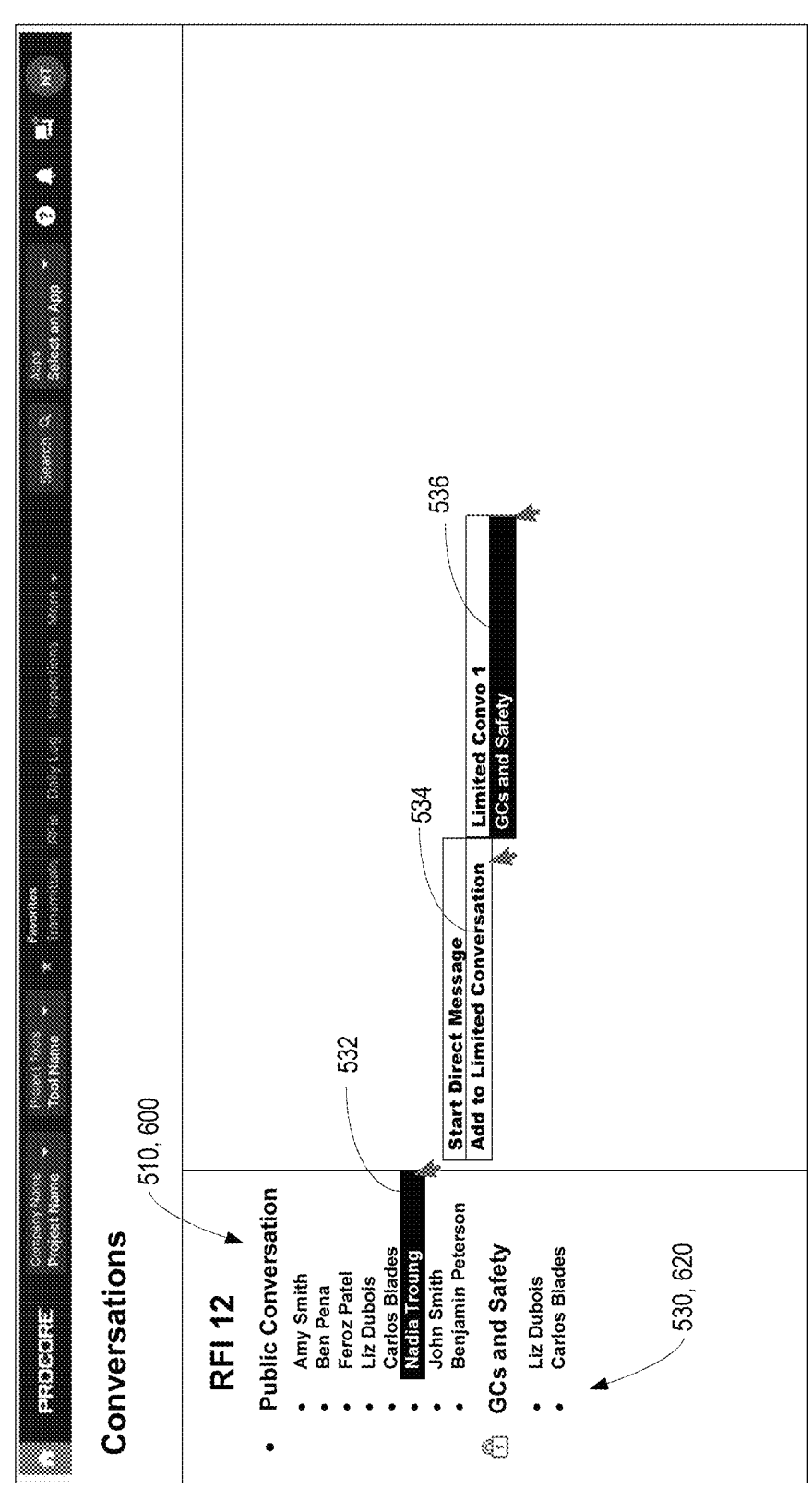
FIG. 5B depicts a second example graphic interface utilized in generating the limited conversation thread of FIG. 4, according to one possible implementation of the disclosed technology.
Figure 5C:
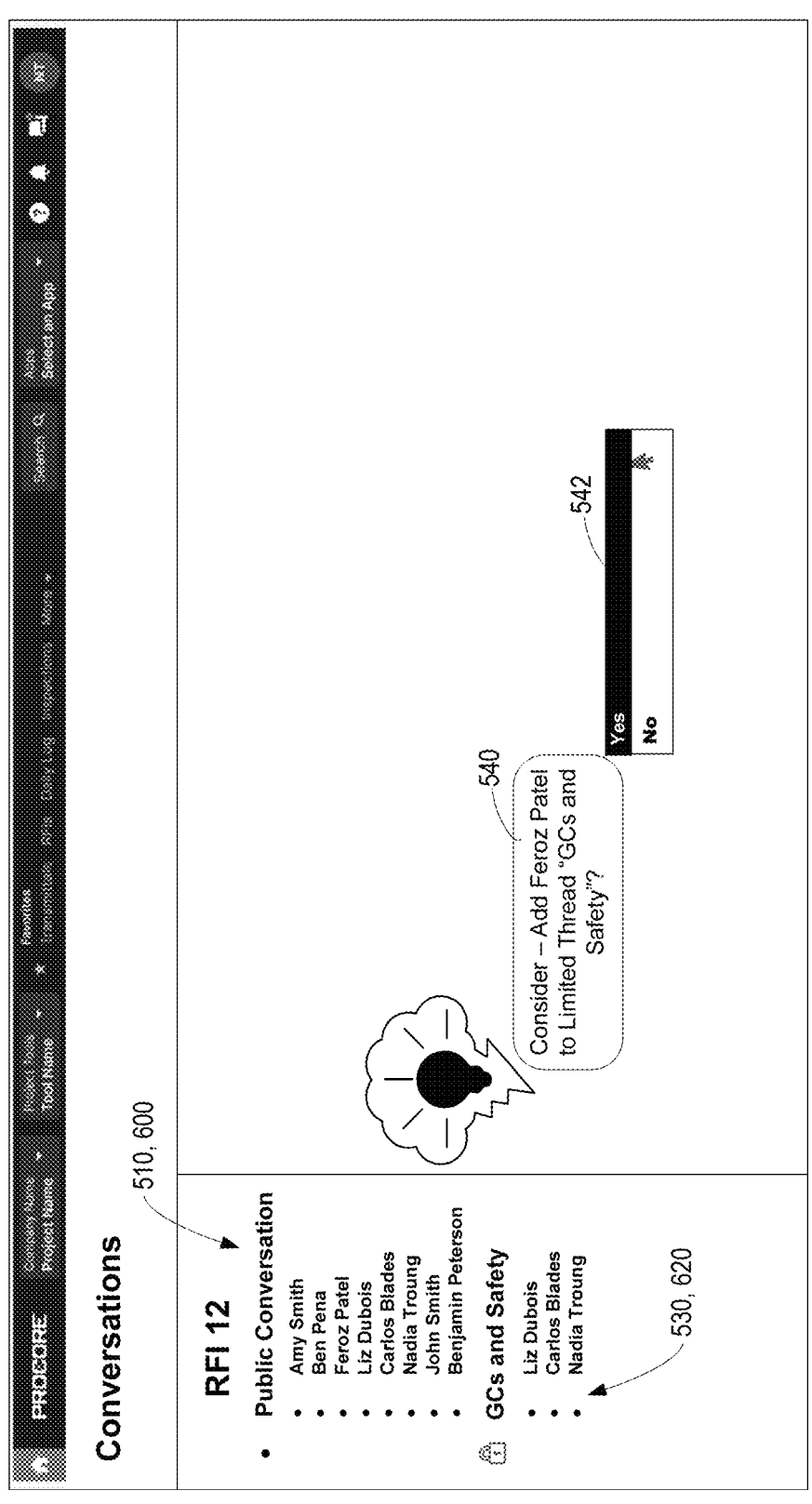
FIG. 5C depicts a second example graphic interface utilized in generating the limited conversation thread of FIG. 4, according to one possible implementation of the disclosed technology.

FIGS. 5A-C each illustrate an example interface for creating one or more limited conversation threads associated with the data object, as described with reference to block 408, and are utilized in receiving the request to create the limited conversation thread in block 410. Referring first to FIG. 5A, a first interface 500a is illustrated, as displayed on at least part of a graphic user interface (GUI) associated with a client device. For example, the GUI from which the first interface 500a is presented may be presented via a display of an end-user device 300). On the left side of the first interface 500a, a first group 600 is represented as a public conversation thread list 510 that illustrates at least some representation of member users of the first group 600 (e.g., some member names may be obscured and further visible via scrolling through the list or otherwise expanding the list for user interface purposes).

The first interface 500a includes one or more first interface features 520, which may include, but are not limited to including nor required to include, a drop down menu 523 for selecting members from the first group 600 for inclusion in a limited conversation thread, a selection indicator 522 for indicating individuals from the drop down menu 523 for inclusion in a limited conversation thread, and a first indicator 525 for indicating where a user of the client device should navigate to add participants to the limited conversation thread. Thus, a user of the client device may be provided with a simplified user experience with the interface 500a, for generating the request to create a limited conversation thread.

In examples wherein the request to create a limited conversation thread includes a title for the limited conversation thread, the interface features 520 for the interface 500a may further include a title indicator 526, which indicates a field 524 (e.g., a text box), within which a user of the client device may enter a desired name for the limited conversation group to be requested (e.g., "GCs and Safety," as shown).

Figure 4:
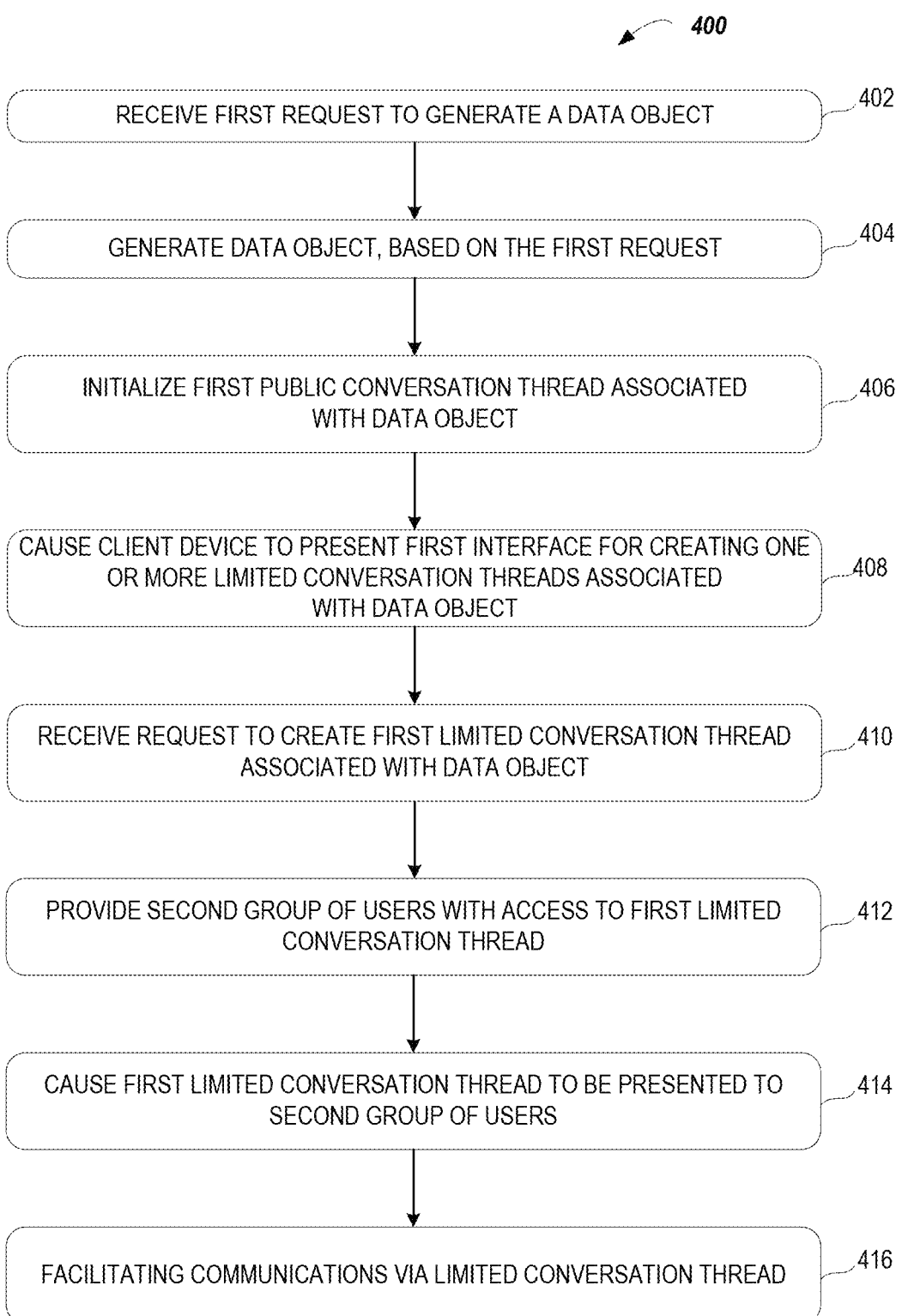
FIG. 4 depicts a flow diagram of an example process for creating limited conversation threads associated with data objects related to a construction project, according to one possible implementation of the disclosed technology.

Turning now to FIG. 5B and with continued reference to FIGS. 4 and 5A, a second interface 500b is illustrated, as displayed on at least part of the GUI associated with the client device. For the purposes of this example, consider the interface 500b being presented via the client device at a time after the interface 500a had been presented via the client device and the request data of FIG. 5A was utilized in creating a limited conversations thread list 530, which is illustrated on the left-hand side of the interface 500b. The limited conversation thread list 530 includes a second group 620, which is a subset of the first group 600.

The example of FIG. 5B illustrates a scenario in which features 532, 534, 536 are utilized to edit or add users from the public conversation thread list 510 to the limited conversation thread list 530. In such an example, first interface feature 532 may be utilized to highlight and/or select a user from the list for first group 600. In some examples, a second feature 534 is included as a function selector for the interface 500b, which may include functions beyond just editing or creating a limited conversation thread (e.g., "Start Direct Message," as illustrated). Further, as illustrated, the third feature 536 is ultimately a selection of what limited conversation thread the highlighted user (at feature 532) is to be entered into.

While the example of FIG. 5B illustrates a scenario in which features 532, 534, 536 are utilized to edit or add users from the public conversation thread list 510 to the limited conversation thread list 530, similar or like options and interface features 532, 534, 536 of FIG. 5B may be utilized to generate an initial request to create a limited conversation thread.

FIG. 5C illustrates a third interface 500c, as displayed on at least part of the GUI associated with the client device, in accordance with FIGS. 4-5B. Similar to FIG. 5B, as illustrated on the left side of the third interface 500c, the public conversation thread list 510 and the limited conversation thread list 530 are representative of respective groups 600, 620. In the example interface 500c, the computing platform 102 is configured to provide suggested user access information 540 via the client device to a user of the computing platform 102. The suggested user access information 540 may be information generated by the computing platform 102 to suggest potential users for inclusion in a limited conversation thread (e.g., the limited conversation thread list 530). While illustrated as a suggestion to add a user to a limited thread, it is certainly contemplated that suggested user access information 540 may be utilized to create entirely new limited conversation threads or significantly modify existing limited conversation threads.

In some examples, the suggested user access information 540 may be generated based on some previous data, stored by the computing platform 102, such as information associated with one or more of users in the conversation thread(s), stored user information, construction project information, user relationships, past performance information, employment records, contract records, among other things associated with construction projects and/or participants thereof. In some examples, the suggested user access information 540 is based on a previous group of users, selected from a common or similar group of users for a public conversation thread. In some such examples, the computing system may evaluate relationships between users (e.g., user A has been in a limited conversation thread 10 times with user B, thus user A could be valuable to a limited conversation thread that includes user B).

Further still, in some examples, the data discussed above for generating suggested user access information 540 may be utilized with a machine learning model to generate or optimize user suggestions for the user access information 540. To that end, the aforementioned data may be utilized to train a machine learning model for predicting users for inclusion in limited conversation threads. Historical data stored on the computing platform 102 may, for example, indicate the aforementioned data and the computing platform 102 may apply one or more machine learning techniques to the data to determine user suggestions.

For example, the computing platform 102 may apply a clustering technique (or sometimes referred to as a cluster analysis), such as a k-means clustering technique, that clusters the aforementioned relevant data based on one or more features included or associated with the aforementioned data. As such, when clustering the sets of user and/or thread data based on their similarities, the computing platform 102, 200 is effectively clustering the user and/or thread data based on the past threads, users, and/or construction projects having similar sets of historical data entities. Various other techniques for determining user suggestions are also possible.

Figure 6:
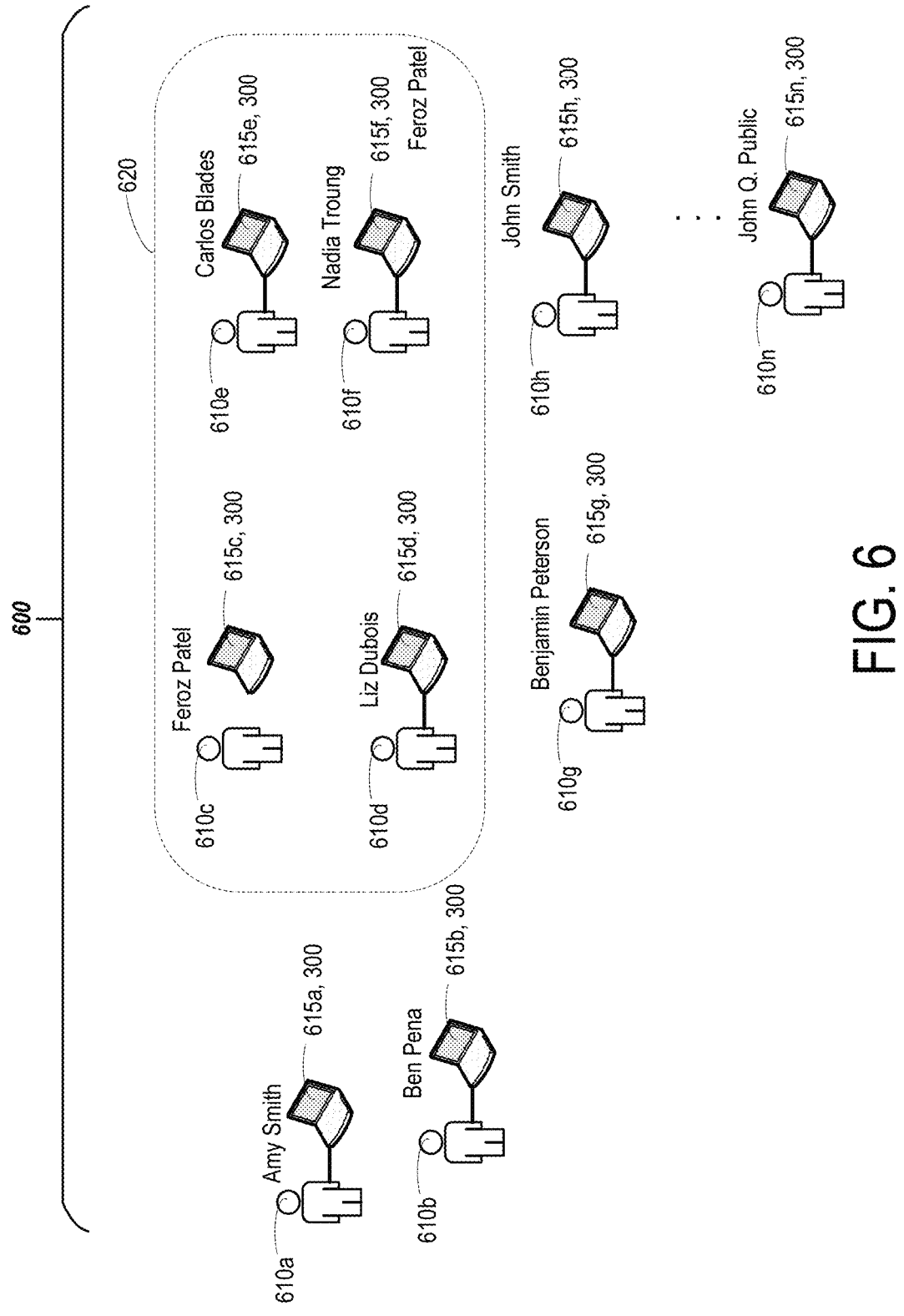
FIG. 6 is a diagram illustrating example grouping of users of the data object(s) disclosed herein, as grouped for public and limited conversation threads, according to one possible implementation of the disclosed technology.

Referring now to FIG. 6 and with continued reference to FIGS. 4-5C, a graphic representation of groups 600, 620 of users 610, each user 610 associated with at least one client device 615 (e.g., an end user device 300). As illustrated, the first group 600, utilized in generating the public conversation thread list 510, includes any number of users 610, up to "n" number of users 615n, each being associated with at least one client device 615, up to "n" number of associated client device(s) 615n. As illustrated, the second group 620 for the limited conversation thread list 530 is a subset of the first group 600, which may include at least some of the users 610 of the first group 600.

Returning now to FIG. 4, in some examples, the computing platform 102 may repeat any of the functions of blocks 408, 410, and 412 to generate any number of additional limited conversation threads associated with the first data object generated at block 404; each additional limited conversation thread will be accessible by another subset of the first group of users (e.g., a second limited conversation thread accessible by a second subset of the first group of users, a third limited conversation thread accessible by a third subset of the first group of users, . . . an nth limited conversation thread accessible by an nth subset of the first group of users). Each additional limited conversation thread may functionally operate in accordance with the functions of blocks 414, 416, discussed below.

Further, in some examples, the computing platform 102 may repeat the functions of blocks 402, 404, and 406 to generate any number of additional data objects associated with the construction project and initialize respective public conversation threads for each data object. Then, functions of blocks 408, 410, and 412 may be performed to generate any number of limited conversation threads for each additional data object, as discussed above.

In such examples involving the generation of multiple data objects, each group of users for each data object's associated public conversation thread may be like, substantially similar, or identical groups of users. In such examples, one or more subsets of the common group of users may be utilized in predicting future subsets of the common group of users, for auto-generating new limited conversation threads. For example, the suggested user access information 540 of FIG. 5C may be generated, at least in part, on said subsets of the common group of users.

ii. Utilizing Limited Conversation Threads for Limited Communications

After the limited conversation thread is created based on the request at block 410, the computing platform 102 provides the second group 620 of users 610 with access to the limited conversation thread, via one or more client devices 615 (block 412). In some examples, the computing platform 102 causes the limited conversation thread to be presented to the second group 620 of users 610, via the client device(s) 615 (block 414). Further still, in some examples, the computing platform 102 facilitates communications between client devices 615 via the limited conversation thread (block 416).

Figure 7:
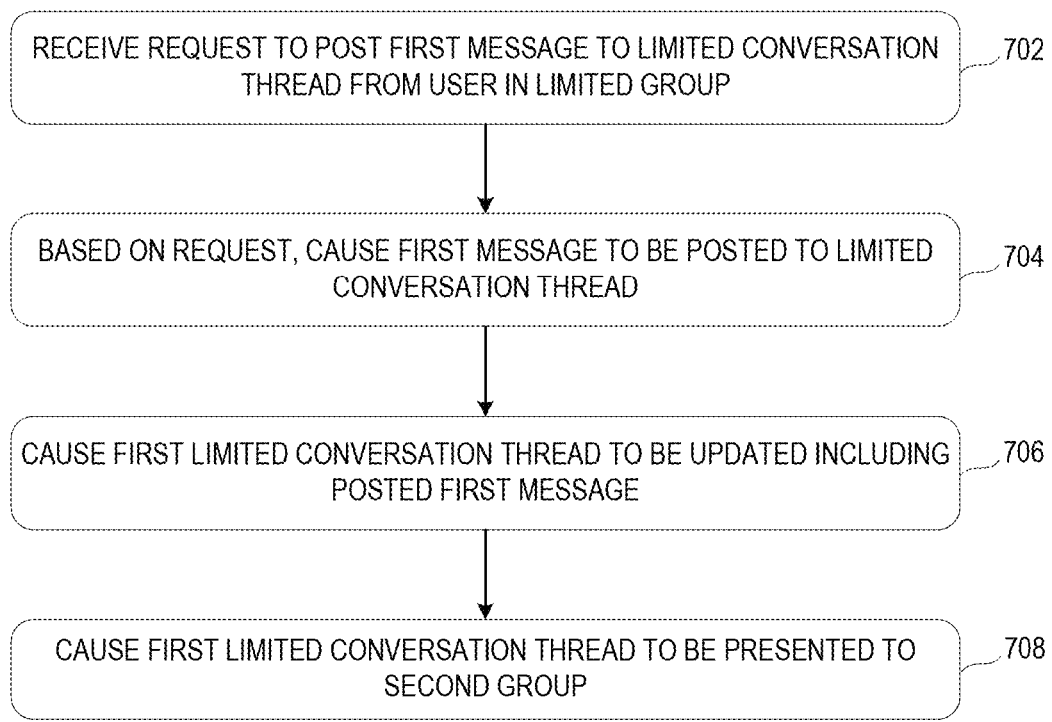
FIG. 7 depicts a flow diagram of an example process utilizing the limited conversation thread(s) discussed with respect to FIGS. 4-6, according to one possible implementation of the disclosed technology.

As discussed above, the limited conversation threads generated by the computing platform 102 are utilized for limited conversations amongst, for example, the users 610 utilizing one or more client device(s) 615. To that end, FIG. 7 is a flow diagram for a method 700, which may be utilized in facilitating limited conversations similar to the functions described above with reference to block 416.

The method 700 begins at block 702, wherein the computing platform 102 receives a request to post a first message to the limited conversation thread from a user in the limited group (e.g., a user in the second group 620, via a client device 615). Then, at block 704, the computing platform 102 causes a message to be posted or otherwise stored to or written to the limited conversation thread, based on the request of block 702. Then, at an additional or alternative block to that of block 704, at block 706, the computing platform 102 may cause the first conversation thread to be updated to include the posted first message. At block 708, the computing platform 102 causes the limited message thread to be presented to one or more users 610 of the second group 620, via one or more client device(s) 615. The steps of the method 700 can be repeated any number of times to post additional messages and/or data and update the thread, for providing fluid, easy, and secure limited communications amongst sub groups associated with a data object.

iii. Example Implementation of Limited Conversation Threads in Applications Executed by the Computing Platform Referring now to FIGS. 8A-D, example interfaces 800 are illustrated, wherein the public and limited conversation threads may be utilized in conjunction with an application of the computing platform 102. In the example interfaces 800, the conversation threads may be presented, via, for example, a GUI presented by a client device. Further, the conversation threads may be presented to a user, via a client device, as a conversation interface 803, within a common interface 800 with a data object interface 801. Thus, the conversation interface 803 may, at least in part, be presented concurrently with the data object interface 801. The data object interface 801 may be any application for presenting, to a user via a client device, one or more data objects. In some examples, the data object interface 801 is for organizing the data objects amongst one or more other data objects related to the construction project (e.g., a listing of data objects associated with a project, a listing of similar data objects, an RFI application for organizing RFIs, etc.).

Turning specifically to the first example interface 800*a*, the data object interface 801 is illustrated in full view, whereas the conversation interface 803 is in a minimized state on the right side of the interface 800*a*. Thus, the conversation interface 803 is capable of being minimized if a user wishes to view the data object interface 801, without the conversation interface 803, but keep the conversation interface 803 available for expansion or maximization if needed.

Figure 8A:
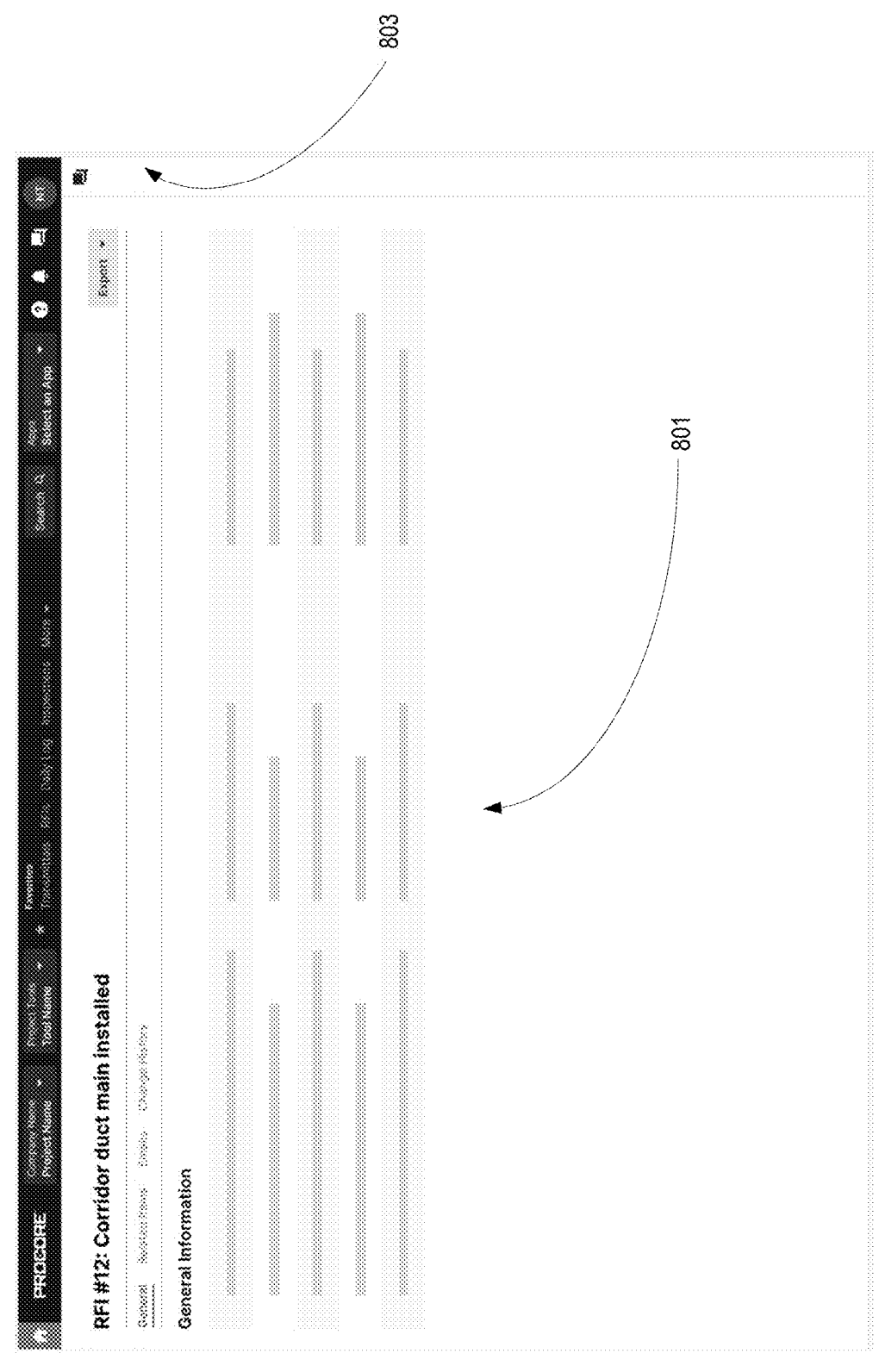
FIG. 8A depicts a first GUI representation of a first construction application, for possible utilization with the process(es) of FIGS. 4-7 and the limited conversation threads thereof, according to one possible implementation of the disclosed technology.
Figure 8B:
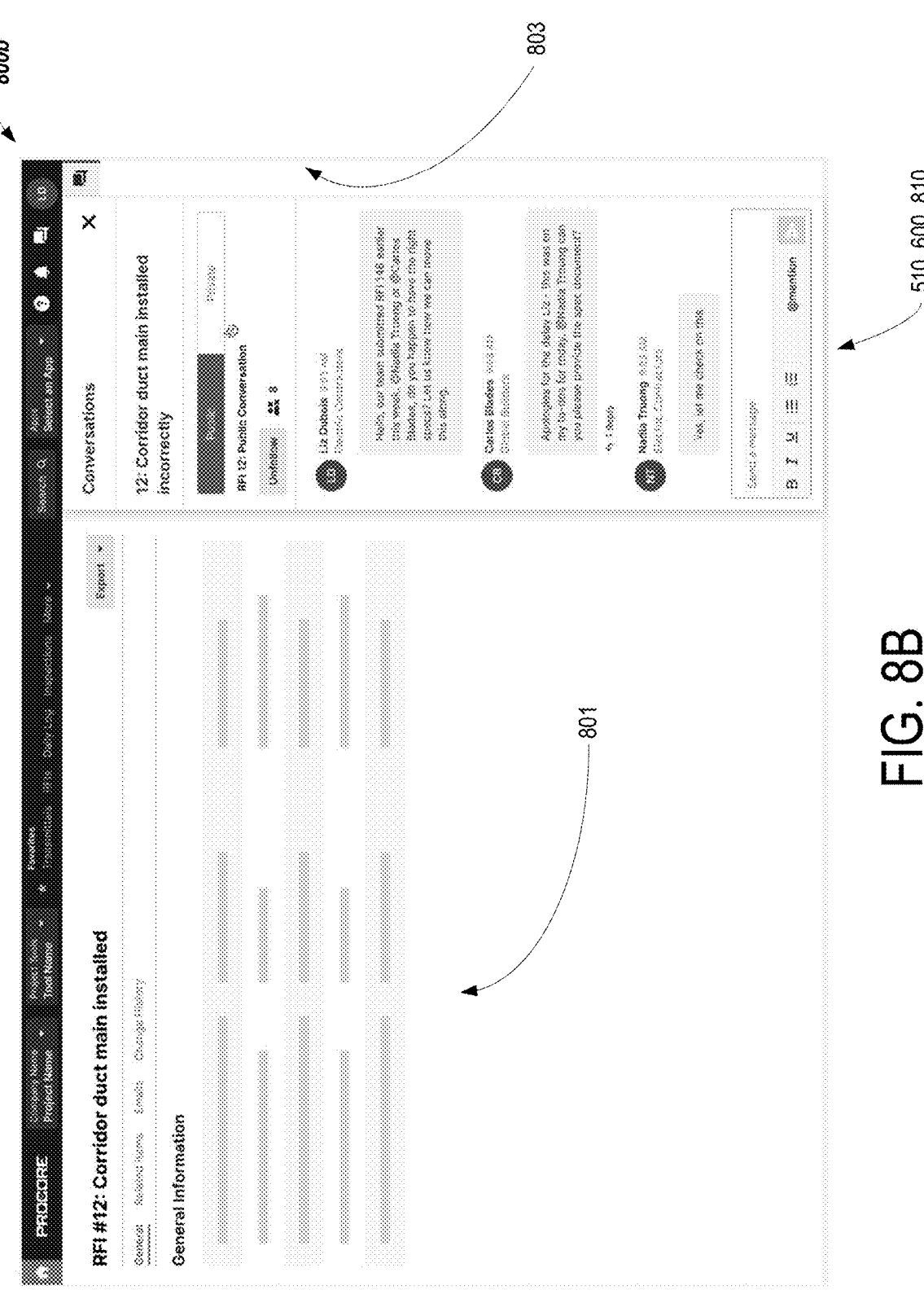
FIG. 8B depicts a second GUI representation of the first construction application of FIG. 8A, for possible utilization with the process(es) of FIGS. 4-8A and the limited conversation threads thereof, according to one possible implementation of the disclosed technology.

FIG. 8B illustrates a second example interface 800*b*, wherein the conversation interface 803 is maximized, with respect to the data object interface 801. As illustrated, a user interacting with the communication interface 803 can select tabs for public and limited conversation threads. In the illustration of FIG. 8B, the interface 800*b* is displaying a public conversation thread 810, including the first group of users 610 and represented by the public conversation thread list 510.

Figure 8C:
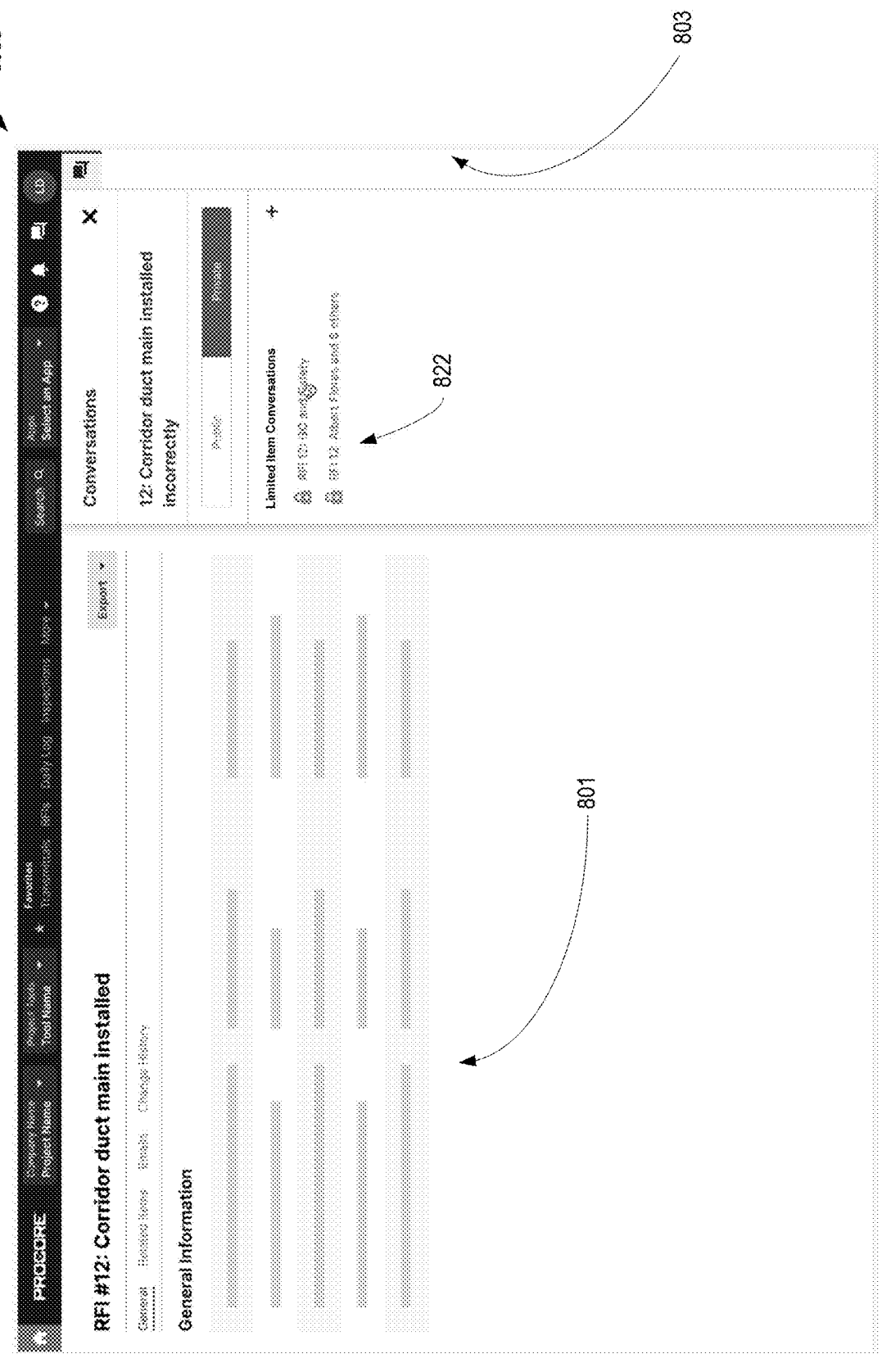
FIG. 8C depicts a third GUI representation of the first construction application of FIGS. 8A, 8B, for possible utilization with the process(es) of FIGS. 4-8B and the limited conversation threads thereof, according to one possible implementation of the disclosed technology.

FIG. 8C is similar to FIG. 8B, however a third example interface 800*c* shows the conversation interface 803 opened to a listing 822 of limited conversation threads for selection. The listing 822 of limited conversation threads is a listing of limited conversation threads that the current user of the interface 800*c* has access to. In some examples, if the user selects, clicks, or otherwise interacts with the listing 822, so that the user enters one of the limited conversation threads on the listing 822, then the selected limited conversation will open in the conversation interface 803 (e.g., example fourth interface 800*d* of FIG. 8D).

Figure 8D:
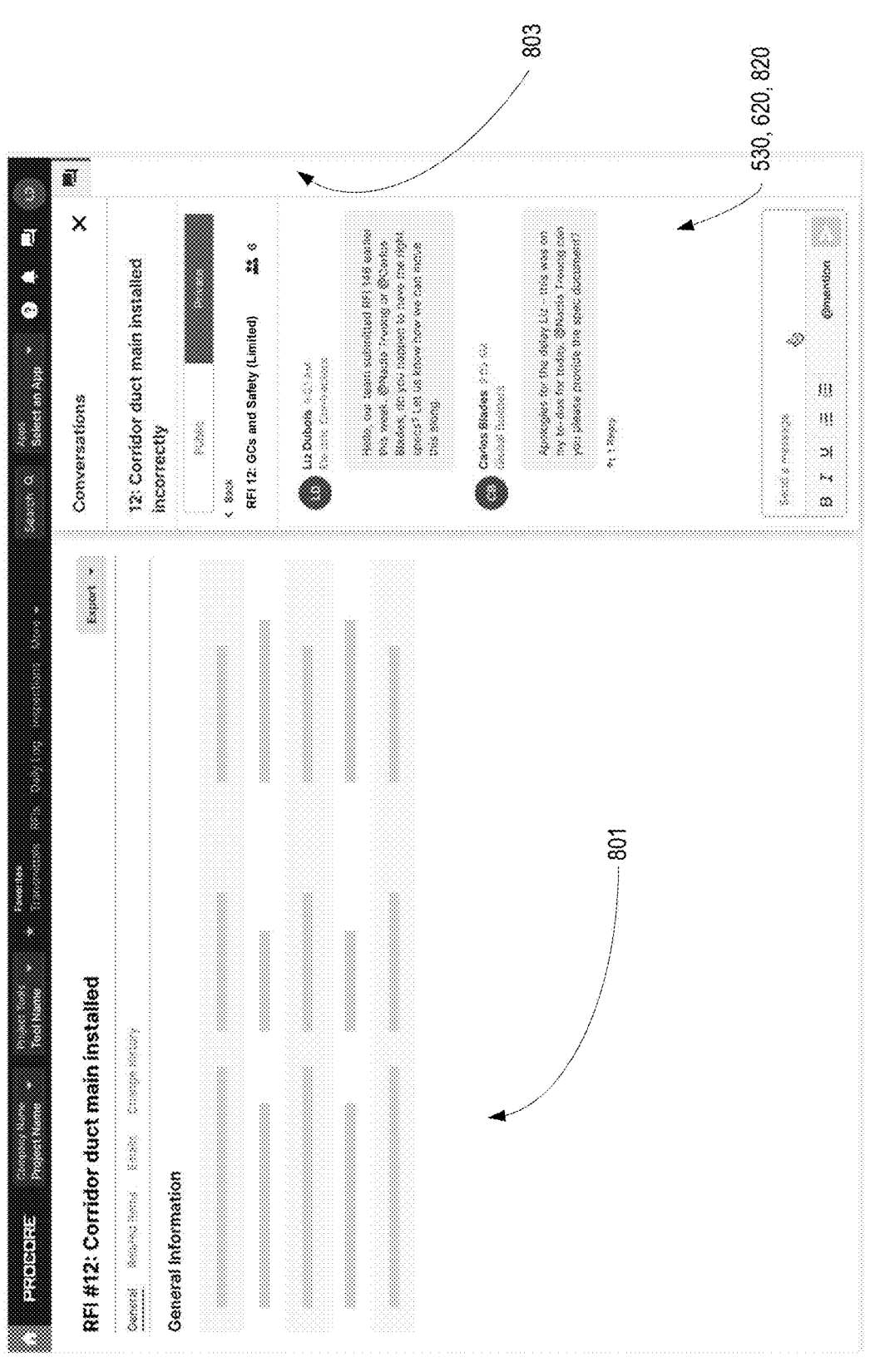
FIG. 8D depicts a fourth GUI representation of the first construction application of FIGS. 8A-C, for possible utilization with the process(es) of FIGS. 4-8C and the limited conversation threads thereof, according to one possible implementation of the disclosed technology.

To that end, FIG. 8D shows the fourth interface 800*d*, wherein a limited conversation 820, based on the second group 620 and the limited conversation thread list 530 thereof, is displayed. Thus, the limited conversation(s) 820 are easily integrated with the data object interface 801, for ease of use and enhanced, directed, secure communication amongst second group 620 members.

Figure 9A:
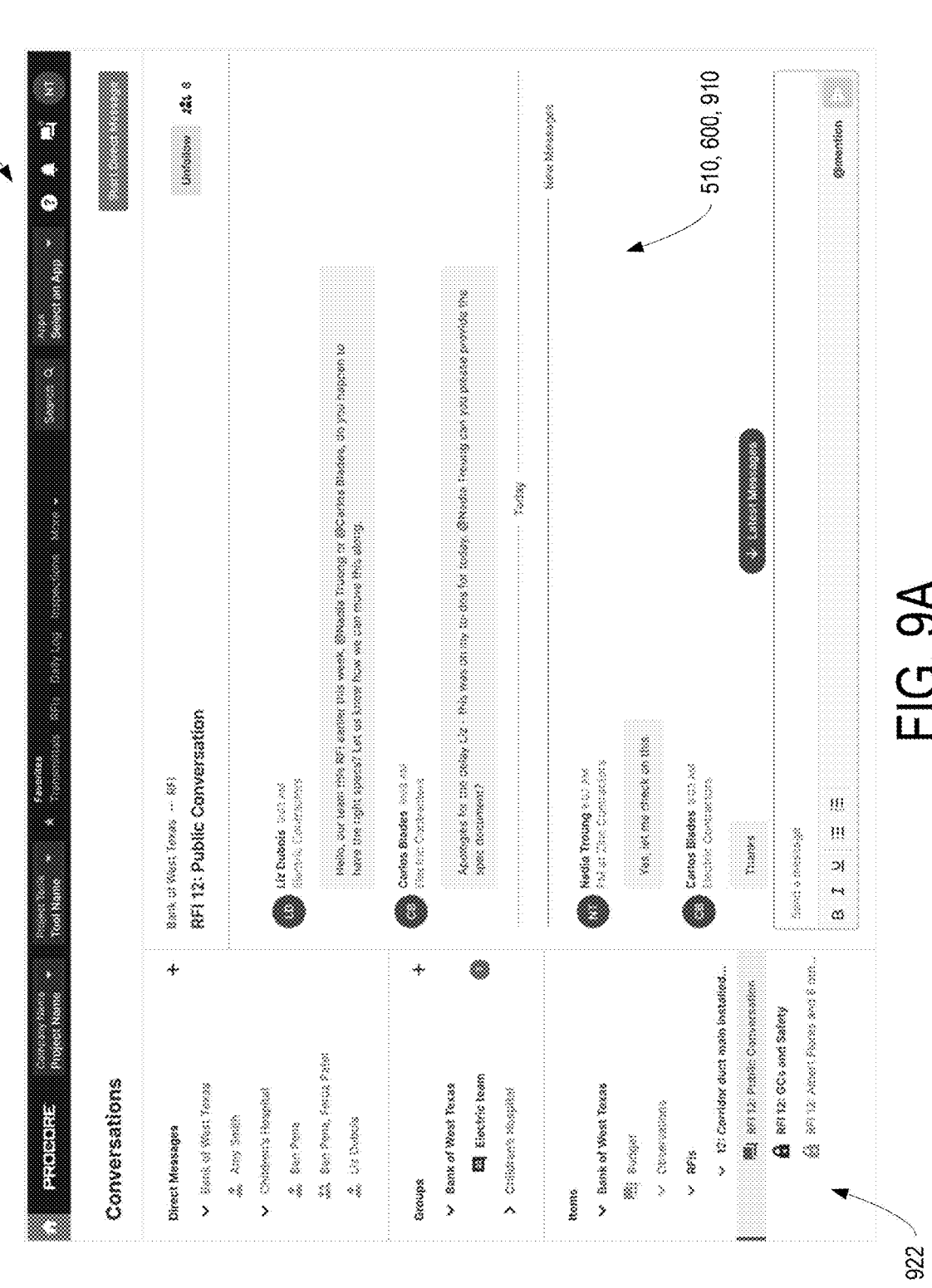
FIG. 9A depicts a first GUI representation of a conversations application, for possible utilization with the process(es) of FIGS. 4-7 and the limited conversation threads thereof, according to one possible implementation of the disclosed technology.
Figure 9B:
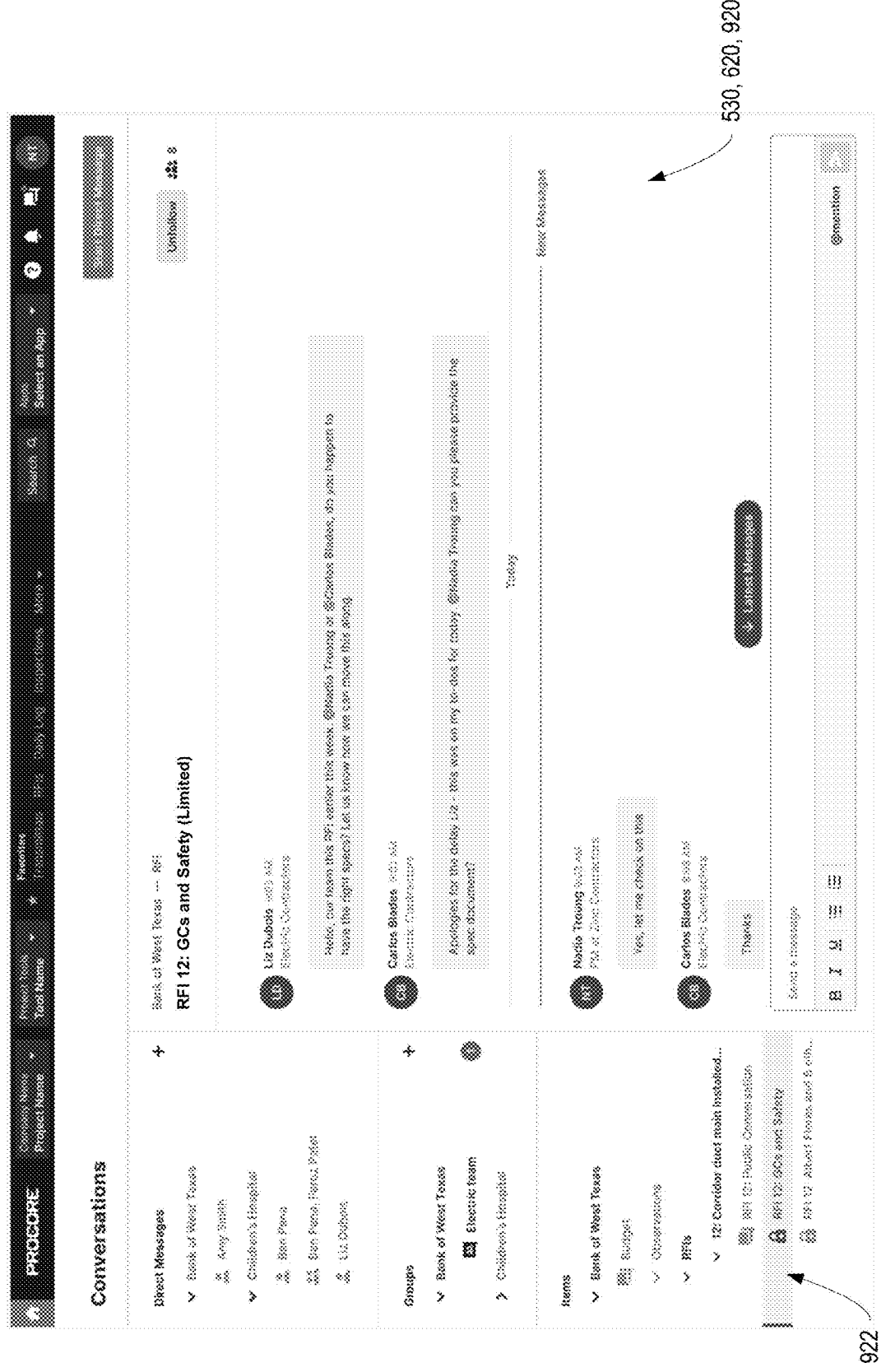
FIG. 9B depicts a second GUI representation of a conversations application of FIG. 9A, for possible utilization with the process(es) of FIGS. 4-7, 9A, and the limited conversation threads thereof, according to one possible implementation of the disclosed technology.

FIGS. 9A, 9B illustrate example conversations interfaces 900, wherein a communications interface 903 is integrated within the conversations interface 900. In such examples, the communications interface 903 is presented concurrently with the conversations interface 900 and the conversations interface 903 functions to organize one or more public conversation threads, limited conversation threads, and one or more other conversation threads or individual conversations (e.g., direct messages). As illustrated in FIG. 9A, a public conversation thread 910 is selected from a listing of threads 922, that are available to the active user of the current interface 900*a*. The public conversation thread 910 may be based on the public conversation thread list 510 and/or the first group 600. Further, as illustrated in FIG. 9B, a limited conversation thread 920 is selected from a listing of threads 922, that are available to the active user of the current interface 900*b*, and the limited conversation thread 920 is displayed via the interface(s) 900*b*, 903. The limited conversation thread 920 may be based on the second group list 520 and/or the second group 620.

IV. CONCLUSION

Example embodiments of the disclosed innovations have been described above. Those skilled in the art will understand, however, that changes and modifications may be made to the embodiments described without departing from the true scope and spirit of the present invention, which will be defined by the claims.

While the foregoing is described in the context of data objects related to construction projects, it should be understood that the disclosed technology may be utilized in connection with other kinds of data objects as well. For example, the disclosed technology may be utilized for generating limited conversation threads in connection with data objects associated with professional or business tasks and projects, data objects associated with academic tasks and projects, data objects associated with legal tasks and projects, data objects associated with interpersonal or social tasks or projects, and the like.

For instance, those in the art will understand that the disclosed operations for training and utilizing machine-learning models in the manner described herein to gather, present, and store incongruous rules and data sets, for the purposes of flowchart or workflow generation, may not be limited to only construction projects. Rather, the disclosed operations could be used in other contexts in connection with other types of projects as well.

Further, to the extent that examples described herein involve operations performed or initiated by actors, such as "humans," "operators," "users," or other entities, this is for purposes of example and explanation only. The claims should not be construed as requiring action by such actors unless explicitly recited in the claim language.

The invention claimed is:
1. A client device comprising:
at least one network interface;
at least one user-interface component;
at least one processor;
at least one non-transitory computer-readable medium; and program instructions stored on the at least one non-transitory computer-readable medium that, when executed by the at least one processor, cause the client device to:

receive, as input from the at least one user-interface component, an indication of a first request to generate a first data object related to a construction project, the first data object representing a construction project task;

generate the first request based on the indication of the first request to generate the first data object related to the construction project;

send the first request to a back-end platform, thereby causing the back-end platform to: (i) based on the first request, generate the first data object representing the construction project task, and (ii) initialize a first public conversation thread associated with the first data object, wherein the first public conversation thread is accessible by each of a first group of users associated with the construction project task;

present a user with a first interface comprising (i) an indication of the first data object, (ii) an indication of the first public conversation thread associated with the first data object, and (iii) a prompt for creating one or more limited conversation threads associated with the first data object;

generate a second request to create a first limited conversation thread associated with the first data object, wherein the first limited conversation thread is only accessible by each of a second group of users, wherein the second group of users is a first subset of the first group of users;

send the second request to the back-end platform thereby causing the back-end platform to, based on the second request, generate the first limited conversation thread, wherein the first limited conversation thread is only accessible by the second group of users; and present the user with a second interface including (i) an indication of the first data object, (ii) an indication of the first limited conversation thread, and (iii) at least one indication of a message input by at least one of the second group of users.

2. The client device of claim 1, wherein sending the second request to the back-end platform further causes the back-end platform to, based on the second request, cause the first limited conversation thread to be presented to the at least one of the second group of users.

3. The client device of claim 1, wherein the second request comprises an identification of users for inclusion in the second group of users.

4. The client device of claim 1, wherein the second request comprises an indication of at least some of the first group of users to include in the second group.

5. The client device of claim 1, wherein the second request comprises a first title for the first limited conversation thread.

6. The client device of claim 1, further comprising program instructions stored on the at least one non-transitory computer-readable medium that, when executed by the at least one processor, cause the client device to receive, as input from the at least one user-interface component, an indication of the second group of users, and wherein the program instructions stored on the at least one non-transitory computer-readable medium that when executed by the at least one processor cause the client device to generate the second request to create the first limited conversation thread comprise program instructions that, when executed by the at least one processor, cause the client device to generate the second request to create the first limited conversation thread based on the indication of the second group of users.

7. The client device of claim 1, further comprising program instructions stored on the at least one non-transitory computer-readable medium that, when executed by the at least one processor, cause the client device to:

generate a third request to generate a second data object related to the construction project;

send the third request to the back-end platform thereby causing the back-end platform to: based on the third request, (i) generate the second data object, and (ii) initializing a second public conversation thread associated with the second data object, wherein second public conversation thread is accessible by each of the first group of users;

present the user with a third interface for creating one or more limited conversation threads associated with the second data object;

generate a fourth request to create a second limited conversation thread associated with the second data object, wherein the second limited conversation thread is accessible by each of a third group of users, wherein the third group of users is a second subset of the first group of users; and present the user with a fourth interface including (i) an indication of the second data object, (ii) an indication of the second limited conversation thread, and (iii) at least one indication of a message input by at least one of the third group of users.

8. The client device of claim 7, further comprising program instructions stored on the at least one non-transitory computer-readable medium that, when executed by the at least one processor, cause the client device to present suggested user access information, via the fourth interface, for the fourth request, the suggested user access information based on the third group of users.

9. The client device of claim 1, wherein the program instructions stored on the at least one non-transitory computer-readable medium that, when executed by the at least one processor, cause the client device to present the first interface comprise program instructions stored on the at least one non-transitory computer-readable medium that, when executed by the at least one processor, cause the client device to present the first interface concurrently with an interface for organizing the first data object amongst one or more other data objects related to the construction project.

10. The client device of claim 1, wherein the program instructions stored on the at least one non-transitory computer-readable medium that, when executed by the at least one processor, cause the client device to present the first interface comprise program instructions stored on the at least one non-transitory computer-readable medium that, when executed by the at least one processor, cause the client device to present the first interface concurrently with a second interface for organizing one or more of the first public conversation thread, the first limited conversation thread, or combinations thereof, amongst one or more other conversation threads related to the construction project.

11. A non-transitory computer-readable medium, wherein the non-transitory computer-readable medium is provisioned with program instructions that, when executed by at least one processor, cause a client device to:

receive an indication of a first request to generate a first data object related to a construction project, the first data object representing a construction project task;

generate the first request based on the indication of the first request to generate the first data object related to the construction project;

send the first request to a back-end platform, thereby causing the back-end platform to: (i) based on the first request, generate the first data object representing the construction project task, and (ii) initialize a first public conversation thread associated with the first data object, wherein the first public conversation thread is accessible by each of a first group of users associated with the construction project task;

present a user with a first interface comprising (i) an indication of the first data object, (ii) an indication of the first public conversation thread associated with the first data object, and (iii) a prompt for creating one or more limited conversation threads associated with the first data object;

generate a second request to create a first limited conversation thread associated with the first data object, wherein the first limited conversation thread is only accessible by each of a second group of users, wherein the second group of users is a first subset of the first group of users;

send the second request to the back-end platform, thereby causing the back-end platform to, based on the second request, generate the first limited conversation thread, wherein the first limited conversation thread is only accessible by the second group of users; and present the user with a second interface including (i) an indication of the first data object, (ii) an indication of the first limited conversation thread, and (iii) at least one indication of a message input by at least one of the second group of users.

12. The non-transitory computer-readable medium of claim 11, wherein sending the second request to the back-end platform further causes the back-end platform to, based on the second request, cause the first limited conversation thread to be presented to the at least one of the second group of users.

13. The non-transitory computer-readable medium of claim 11, wherein the second request comprises an identification of users for inclusion in the second group of users.

14. The non-transitory computer-readable medium of claim 11, wherein the second request comprises an indication of at least some of the first group of users to include in the second group.

15. The non-transitory computer-readable medium of claim 11, wherein the second request comprises a first title for the first limited conversation thread.

16. A method carried out by a client device, the method comprising:

receiving an indication of a first request to generate a first data object related to a construction project, the first data object representing a construction project task;

generating the first request based on the indication of the first request to generate the first data object related to the construction project;

sending the first request to a back-end platform, thereby causing the back-end platform to: (i) based on the first request, generate the first data object representing the construction project task, and (ii) initialize a first public conversation thread associated with the first data object, wherein the first public conversation thread is accessible by each of a first group of users associated with the construction project task;

presenting a user with a first interface comprising (i) an indication of the first data object, (ii) an indication of the first public conversation thread associated with the first data object, and (iii) a prompt for creating one or more limited conversation threads associated with the first data object;

generating a second request to create a first limited conversation thread associated with the first data object, wherein the first limited conversation thread is only accessible by each of a second group of users, wherein the second group of users is a first subset of the first group of users;

sending the second request to the back-end platform thereby causing the back-end platform to, based on the second request, generate the first limited conversation thread, wherein the first limited conversation thread is only accessible by the second group of users; and presenting the user with a second interface including (i) an indication of the first data object, (ii) an indication of the first limited conversation thread, and (iii) at least one indication of a message input by at least one of the second group of users.

17. The method of claim 16, further comprising receiving an indication of the second group of users, and wherein generating the second request to create the first limited conversation thread comprises generating the second request to create the first limited conversation thread based on the indication of the second group of users.

18. The method of claim 16, further comprising:

generating a third request to generate a second data object related to the construction project;

sending the third request to the back-end platform thereby causing the back-end platform to: based on the third request, (i) generate the second data object, and (ii) initializing a second public conversation thread associated with the second data object, wherein second public conversation thread is accessible by each of the first group of users;

presenting the user with a third interface for creating one or more limited conversation threads associated with the second data object;

generating a fourth request to create a second limited conversation thread associated with the second data object, wherein the second limited conversation thread is accessible by each of a third group of users, wherein the third group of users is a second subset of the first group of users; and presenting the user with a fourth interface including (i) an indication of the second data object, (ii) an indication of the second limited conversation thread, and (iii) at least one indication of a message input by at least one of the third group of users.

19. The method of claim 18, further comprising presenting suggested user access information, via the fourth interface, for the fourth request, the suggested user access information based on the third group of users.

20. The method of claim 16, wherein presenting the first interface comprises presenting the first interface concurrently with a second interface for organizing one or more of the first public conversation thread, the first limited conversation thread, or combinations thereof, amongst one or more other conversation threads related to the construction project.

* * * * *